(12) United States Patent
Chai

(10) Patent No.: US 6,286,632 B1
(45) Date of Patent: Sep. 11, 2001

(54) BRAKE UNIT FOR SCOOTER

(76) Inventor: Kao Teh Chai, No.160-1, Hsia Ta Ku, Ta Tung Tsun, Kuan Yin Hsiang, Tao Yuan Hsien (TW)

( * ) Notice: Subject to any disclaimer, the term of this patent is extended or adjusted under 35 U.S.C. 154(b) by 0 days.

(21) Appl. No.: 09/819,487

(22) Filed: Mar. 27, 2001

(51) Int. Cl.[7] .............................. B60T 1/00; B62M 1/00
(52) U.S. Cl. ................. 188/29; 280/87.041; 188/19
(58) Field of Search ..................... 188/19, 29; 280/63, 280/87.041, 87.042, 200

(56) References Cited

U.S. PATENT DOCUMENTS

| | | | |
|---|---|---|---|
| 5,499,697 | * | 3/1996 | Trimble et al. ........................ 188/29 |
| 6,120,044 | * | 9/2000 | Tsai ..................................... 280/87.05 |
| 6,139,035 | * | 10/2000 | Tsai ................................... 280/87.041 |

\* cited by examiner

Primary Examiner—Chris Schwartz
(74) Attorney, Agent, or Firm—Pro-Techtor International Services

(57) ABSTRACT

A brake unit for a scooter mainly includes a foot pedal having an eccentric head integrally formed at a lower rear portion thereof, a brake shoe, a rear-wheel support, and a push element having a spring put around it. The foot pedal is pivotally mounted to a front part of the rear-wheel support and the brake shoe is mounted to a rear part of the rear-wheel support between a rear wheel and the foot pedal. The push element is connected to a middle part of the rear-wheel support with a front end thereof normally pushed against the foot pedal by the spring and a rear end thereof connected to a fastening screw forward extended from the brake shoe. When the foot pedal is stepped down, the eccentric head thereof contacts with the front end of the push element and pushes the push element rearward to force the brake shoe tightly against the rear wheel and thereby brake the scooter.

2 Claims, 2 Drawing Sheets

BRAKE UNIT FOR SCOOTER

FIELD OF THE INVENTION

The present invention relates to a brake unit for a scooter, and more particularly to a brake unit that allows a rider to safely and effectively brake a scooter with only a minor force by stepping down a foot pedal mounted closely in front of a rear wheel of the scooter.

BACKGROUND OF THE INVENTION

Most of the currently available scooters include a brake cover. A rider may step down the brake cover to press the same against a rear wheel of the scooter and thereby brakes the scooter. However, a force acted on the rear wheel by directly pressing the brake cover against the rear wheel is not strong enough to provide good braking effect. The rider of the scooter is therefore subject to a potential danger.

SUMMARY OF THE INVENTION

A primary object of the present invention is to provide a brake unit that enables a rider of a scooter to safely and effectively brake the scooter with only a minor force.

To achieve the above and other objects, the brake unit for a scooter according to the present invention mainly includes a foot pedal having an eccentric head integrally formed at a lower rear portion thereof, a brake shoe, a rear-wheel support, and a push element having a spring put around it. The foot pedal is pivotally mounted to a front part of the rear-wheel support and the brake shoe is mounted to a rear part of the rear-wheel support between a rear wheel and the foot pedal. The push element is connected to a middle part of the rear-wheel support with a front end thereof normally pushed against the foot pedal by the spring and a rear end connected to a screw forward extended from the brake shoe. When the foot pedal is stepped down, the eccentric head thereof contacts with the front end of the push element and pushes the push element rearward to force the brake shoe against the rear wheel and thereby brake the scooter.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
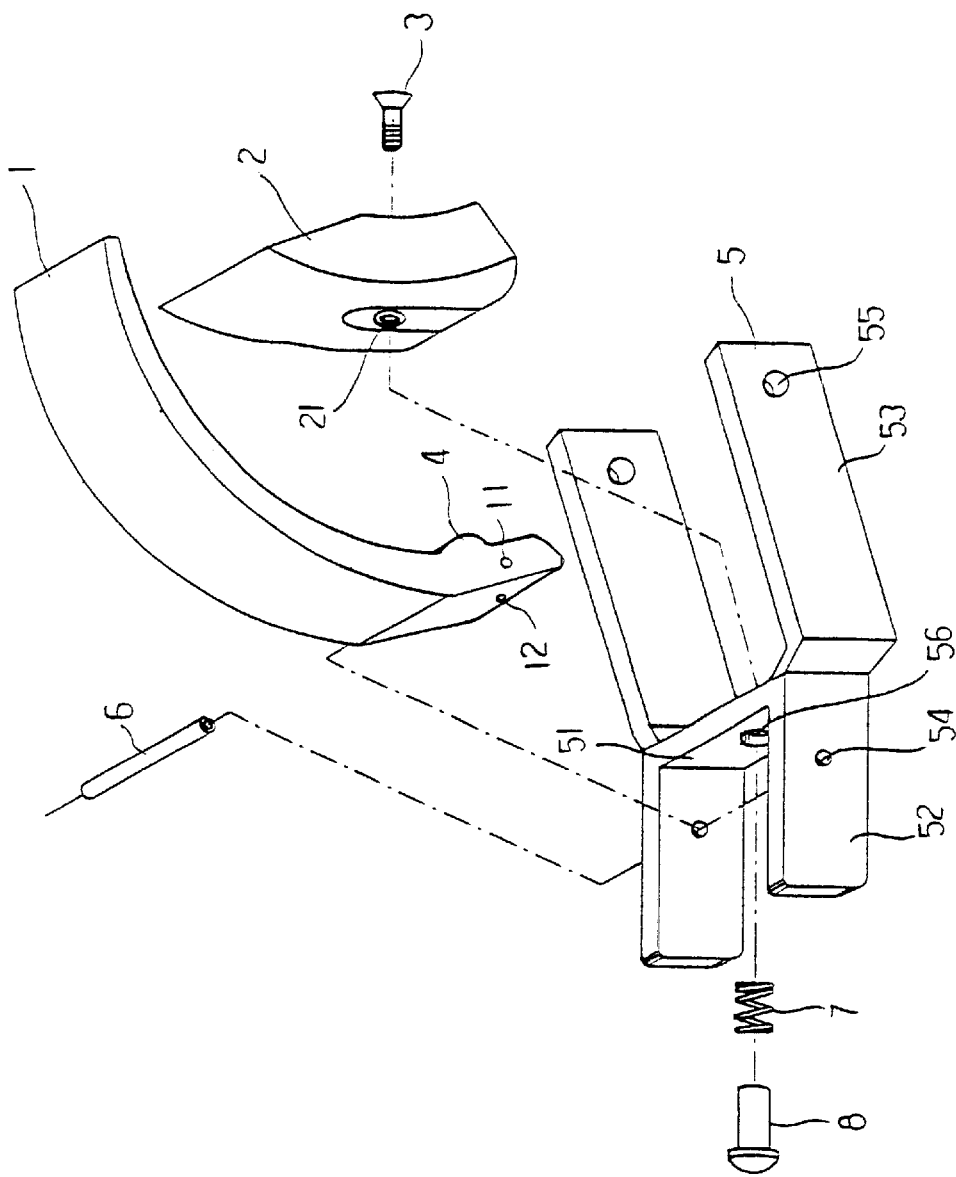
FIG. 1 is an exploded perspective of a brake unit for a scooter according to the present invention.

Please refer to FIG. 1 that is an exploded perspective of a brake unit for a scooter according to the present invention. As shown, the brake unit mainly includes a foot pedal 1, a brake shoe 2, a fastening screw 3, an eccentric head 4, a rear-wheel support 5, a pivot pin 6, a spring 7, and a hollow push element 8.

The eccentric head 4 is integrally formed at a lower rear portion of the foot pedal 1. A pivot-pin hole 11 is formed on the foot pedal 1 below the eccentric head 4 to extend across the foot pedal 1 for the pivot pin 6 to extend therethrough. A pull-cord hole 12 is also formed on the foot pedal 1 below the pivot-pin hole 11 to downward incline from a lower front to a lower rear end of the foot pedal 1.

The brake shoe 2 is provided at a predetermined position with a connecting hole 21 via which the fastening screw 3 is extended.

The rear-wheel support 5 includes a transverse middle wall portion 51 having a push-element hole 56, a front support portion 52 having two spaced front arms that forward extend from the middle wall portion 51 and are provided with two front mounting holes 54, and a rear support portion 53 having two spaced rear arms that rearward extend from the middle wall portion 51 and are provided with two rear mounting holes 55.

Figure 2:
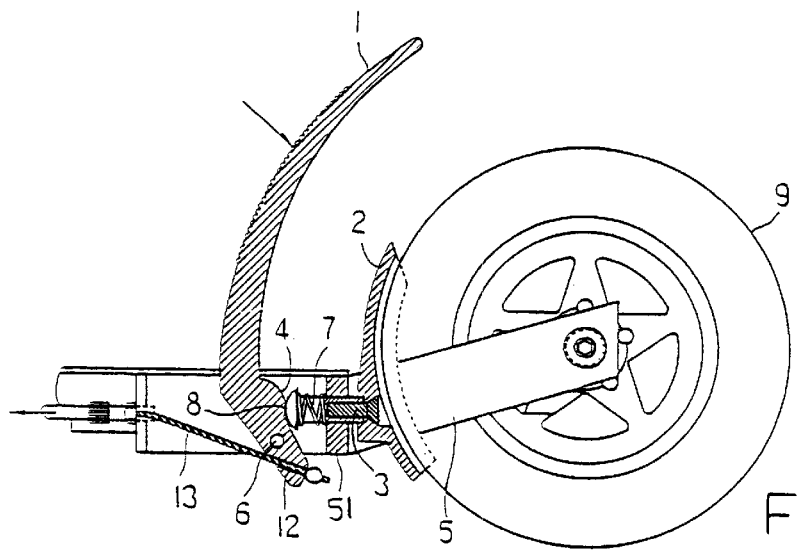
FIG. 2 is an assembled side view of the brake unit for a scooter according to the present invention.

FIG. 2 is a side view showing the brake unit of the present invention in an assembled state. As shown, a rear wheel 9 of the scooter (not shown) is rotatably mounted on the real-wheel support 5 between the two rear arms of the rear support portion 53 on an axle (not shown) extended through the two rear mounting holes 55. The foot pedal 1 is pivotally mounted on the real-wheel support between the two front arms of the front support portion 52 by extending the pivot pin 6 through the two front mounting holes 54 and the pivot-pin hole 11. The brake shoe 2 is mounted on the real-wheel support 5 between the two rear arms of the rear support portion 53 to locate between the real wheel 9 and the middle wall portion 51. The brake shoe 2 is fixed in place in the rear support portion 53 by forward extending the fastening screw 3 through the connecting hole 21 on the brake shoe 2 into the hollow push element 8 that is rearward extended through the push-element hole 56 on the middle wall portion 51 of the rear-wheel support 5. The spring 7 is put around the push element 8 to locate between an expanded head of the push element 8 and the middle wall portion 51. The push element 8 is normally pushed forward by the spring 7 to press the expanded head against a point of the foot pedal 1 below the eccentric head 4.

A hand-controlled pull cord 13 is connected at a front end to a brake lever (not shown) mounted on a handlebar (not shown) of the scooter and at a rear end to the pull-cord hole 12 on the foot pedal 1. By pressing the brake lever at the handlebar of the scooter, a rider may pull the cord 13 and accordingly the foot pedal 1 to brake the scooter.

Figure 3:
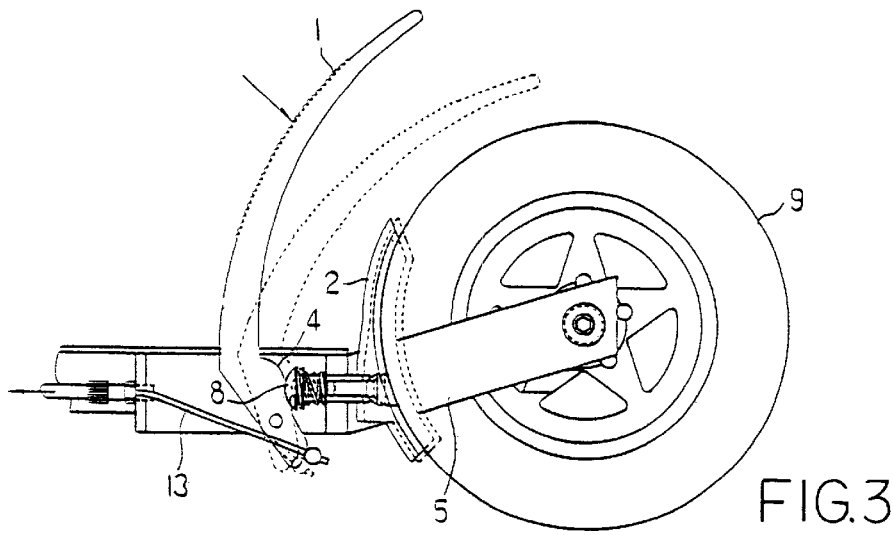
FIG. 3 is a side view showing a foot pedal of the brake unit for a scooter according to the present invention is initially depressed to brake the scooter.
Figure 4:
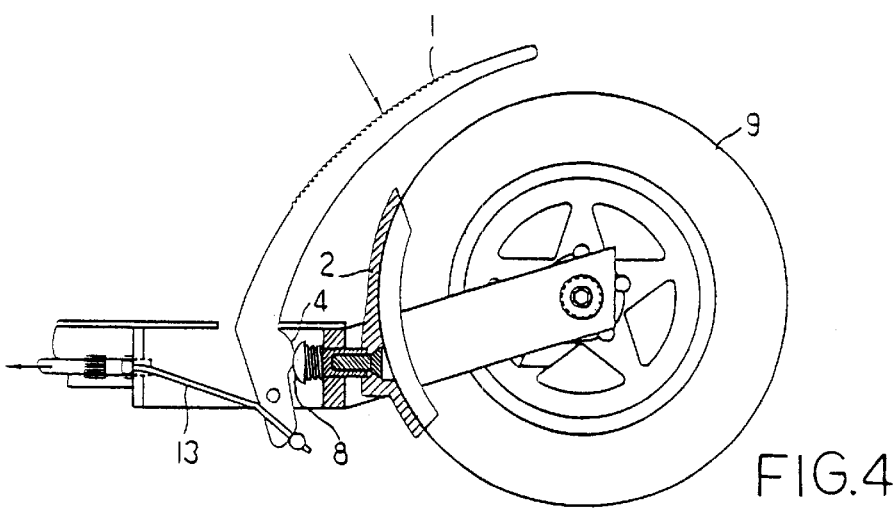
FIG. 4 is a side view showing the foot pedal of the brake unit for a scooter according to the present invention is fully depressed to brake the scooter.

Please refer to FIG. 3. When a rider steps down an upper portion of the foot pedal 1 with one foot or pulls a lower portion of the foot pedal 1 forward by pulling the pull cord 13 with one hand, the eccentric head 4 integrally formed on the lower portion of the foot pedal 1 eccentrically contacts with and pushes the push element 8 rearward, so that the brake shoe 2 is forced toward the rear wheel 9 and finally tightly contacts with the rear wheel 9 to brake the scooter. And, when the rider no longer steps down the upper portion of the foot pedal 1 or the rider releases the brake lever, the push element 8 with the spring 7 automatically pushes the eccentric head 4 forward for the brake shoe 2 to move away from the rear wheel 9, allowing the scooter to move forward again.

With the above arrangements, the brake unit of the present invention enables a rider to safely and quickly brake a scooter with only a minor force. The present invention is therefore superior to other brake units of prior art for scooters.

What is claimed is:

1. A brake unit for a scooter, comprising a foot pedal having an eccentric head integrally formed at a lower rear portion thereof, a brake shoe having a connecting hole provided at a predetermined position for a fastening screw to extend therethrough, a rear-wheel support, a pivot pin, and a hollow push element having a spring put around it;

said rear-wheel support including a transverse middle wall portion having a push-element hole, a front support portion having two spaced front arms that forward extend from said middle wall portion and are provided with two front mounting holes, and a rear support portion having two spaced rear arms that rearward extend from said middle wall portion and are provided with two rear mounting holes through which an axle is extended for a rear wheel of said scooter to rotatably mount thereon; and said foot pedal being pivotally mounted on said real-wheel support between said two front arms of said front support portion by extending said pivot pin through said two front mounting holes and a pivot-pin hole provided on said foot pedal below said eccentric head; said brake shoe being movably mounted on said real-wheel support between said two rear arms of said rear support portion to locate between said real wheel and said middle wall portion by forward extending said fastening screw through said connecting hole on said brake shoe into said hollow push element that is rearward extended through said push-element hole on said middle wall portion of said rear-wheel support; and said spring put around said push element normally pushing a front head of said push element forward to press against a point of said foot pedal below said eccentric head;

whereby when said foot pedal is stepped down, said eccentric head eccentrically contacts with and pushes said push element rearward to force said brake shoe tightly against said rear wheel to brake said scooter.

2. The brake unit for a scooter as claimed in claim 1, wherein said foot pedal is provided below said pivot-pin hole with a pull-cord hole to which a pull cord extended from a brake lever mounted on a handlebar of said scooter is connected, whereby a lower portion of said foot pedal may be pulled forward by pulling said pull cord via said brake lever on said handlebar to cause said eccentric head to eccentrically contact with and push said push element rearward to force said brake shoe tightly against said rear wheel to brake said scooter.

* * * * *